April 25, 1967 C. E. LENZ 3,316,503

DIGITAL PHASE-MODULATED GENERATOR

Filed May 18, 1964 3 Sheets-Sheet 1

INVENTOR.
CHARLES E. LENZ
BY [signature]
ATTORNEY

SYMBOLS PARENTHESES APPLY TO FIXED— PHASE GENERATOR

INVENTOR.
CHARLES E. LENZ

BY

ATTORNEY

INVENTOR.
CHARLES E. LENZ

BY [signature]

ATTORNEY 3,316,503

DIGITAL PHASE-MODULATED GENERATOR

Charles E. Lenz, Fullerton, Calif., assignor to North American Aviation, Inc.

Filed May 18, 1964, Ser. No. 368,090
6 Claims. (Cl. 332—16)

This invention relates to a phase generator and more particularly to a digital phase-modulated generator in which the total amount of phase shift is unlimited, and the relationship between the input and resultant phase shift is linear, regardless of how large the phase shift may become.

In prior know phase-modulated generators, the amount of phase shift obtainable in the linear operating region has been limited from between ±14° to ±28°, the latter range being obtained with the Armstrong-type phase modulator. (Ref.: Terman, Frederick E.; Radio Engineering, McGraw-Hill Book Co., Inc., 1947, pp. 496–497.) If distortion is ignored, the maximum phase shift available from an Armstrong or similar phase modulator is less than 90°. A non-conventional type circuit utilizing a phasitron tube is capable of extending the linear phase-modulated range to ±360° (ref.: Thomas, H. P., "Phasitron F-M Transmitter," Electronics, col. 19, p. 108).

Although phase shift over an unlimited range can be obtained by adding the outputs of a resolver having the inputs in quadrature, mechanical motion which limits dynamic response is required. In contrast, no moving parts are employed in the digital phase-modulated generator, resulting in superior dynamic response and stability.

The digital phase-modulated generator contemplated by this invention has linearity over an unlimited range of phase shift. The input of the phase-modulated generator is compatible with the output of a digital computer without the use of an elaborate converter. Consequently, the phase-modulated generator can be used as a component in various types of converters for producing, for example, a resolver output. Also, the angular phase shift produced by the phase-modulated generator is independent of frequency drift.

It is, therefore, an object of this invention to provide a digital phase modulated generator.

It is a further object of this invention to generate a square or sine wave, the phase of which will be advanced or retarded by $2\pi 4/n$ electrical radians in response to arbitrary input pulses. The number $n$ being an even positive integer dependent upon the design of the phase-modulated generator.

It is still another object of this invention to provide a phase-modulated generator which can provide an unlimited amount of phase shift.

It is a still further object of this invention to provide an electronic circuit having an output which can be phase shifted, as a linear function of the input, over an unlimited range.

A still further object of this invention is to provide an electronic phase-modulated generator that is directly compatible for use with digital computers.

These and other objects of this invention will become apparent from the following description taken in connection with the accompanying drawings in which.

*General description*

Figure 1:
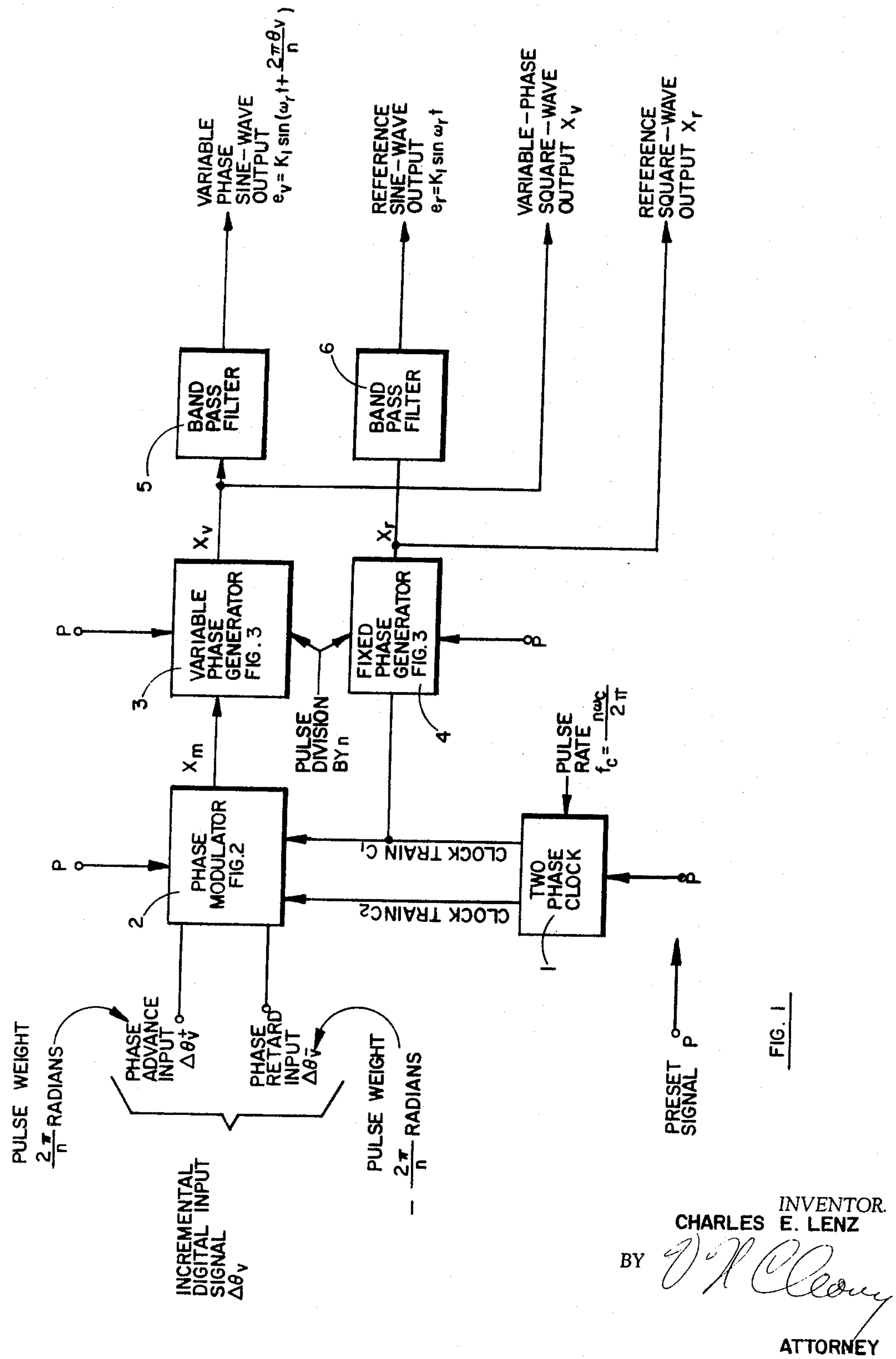
FIG. 1 is a block diagram of the digital phase-modulated generator.

A block diagram of the digital phase-modulated generator appears in FIG. 1. The basic phase-modulated generator consists of a two-phase clock 1, a phase modulator 2, and a variable-phase generator 3. These components alone provide a logical square-wave output $X_v$. In addition, optional components are shown to provide other features. The fixed-phase generator 4 can be employed to supply a logical reference square-wave output $X_r$ of constant phase. Either or both of the band-pass filters 5 and 6 may be added to supply sinusoidal outputs $e_v$ and $e_r$, corresponding to square-wave outputs $X_v$ and $X_r$, respectively, in the steady state.

Two pulse trains $C_1$ and $C_2$, of constant and equal repetition rates are provided by the two-phase clock 1. Each pulse of train $C_2$ is timed to succeed and proceed the two adjacent pulses of $C_1$ by the same time interval. The pulses of both trains $C_1$ and $C_2$ will typically have duty cycles no greater than 0.25.

The phase modulator 2 has two incremental digital signal inputs, viz.: phase-advance input $\Delta\theta_v^+$ and phase-retard $\Delta\theta_v^-$. In addition, the phase modulator 2 also has as inputs clock trains $C_1$ and $C_2$. In the steady state with no incremental digital input signals applied, the output $X_m$ of the phase modulator is the clock train $C_1$. For each phase-advance pulse applied at input $\Delta\theta_v^+$, the phase modulator 2 will emit one pulse from clock train $C_2$ at $X_m$, in addition to the pulses from clock train $C_1$ normally emitted there. Since the pulses of trains $C_1$ and $C_2$ do not overlap, an additional pulse is thus sent to the variable-phase generator 3. For each phase-retard pulse applied at input $\Delta\theta_v^-$, the phase modulator will remove one $C_1$ clock pulse which would normally be emitted at $X_m$. The input pulses applied at $\Delta\theta_v^+$ and $\Delta\theta_v^-$ can arrive at arbitrary times; after the arrival of such a pulse, a pulse will be added to or removed from the train at $X_m$ as soon as possible consistent with logical operations necessary within the phase modulator 2.

The variable-phase generator 3 is a cyclic counter comprising a plurality of interconnected flip-flop stages having $n$ states such that the state of the highest-order stage will change each time $n/2$ pulses are applied to it at $X_m$. Other types of variable-phase generators capable of supplying the multiple-phase outputs at $X_v$ may be used.

The fixed-phase generator 4 is identical in design to the variable-phase generator 3. The input to this generator, however, is the primary clock train $C_1$.

A preset pulse P is applied to the flip-flops of all components in such a manner as to predominate over all other signals which may be simultaneously applied to each flip-flop. In this manner proper initial conditions are established. The removal of this preset signal must be synchronized to avoid truncation of any clock pulse.

In discussing the over-all operation of the phase-modulated generator, the input may be considered to be a jump function (ref.: Gardner, Murray F., and Barnes, John L., Transients in Linear Systems. New York: John Wiley & Sons, Inc., 1952, pp. 287 ff.).

$$\theta_v(t)=\frac{2\pi}{n}\int\frac{n\theta_i}{2\pi}(t) \quad (1)$$

where $n$ represents the number of states of the counter in the variable-phase generator 3, and $\theta_i(t)$ is an arbitrary continuous function of time $t$ such that $$\theta_i(0)=0 \qquad (2)$$

In accordance with the definition of a jump function, $(2\pi)^{-1}n\theta_v(t)$ will instantaneously assume any integral value taken by $(2\pi)^{-1}n\theta_i(t)$ and will retain that value until $(2\pi)^{-1}n\theta_i(t)$ takes another integral value. The value of $\theta_v(t)$ at a discontinuity will be taken as the value of $\theta_v(t)$ as $t$ approaches the discontinuity from the right.

It is now convenient to define a function $\Delta\theta_v(t)$ such that $$\Delta\theta_v(t)=\lim_{\delta\to 0}\,[\theta_v(t)-\theta_v(t-\delta)] \qquad (3)$$

Two functions suitable for use as inputs to the phase modulator 2 may now be defined through use of Relation (3), viz., $$\Delta\theta_v{}^{+}(t)=\begin{cases}\Delta\theta_v(t),\ \Delta\theta_v(t)\geq 0 & (4a)\\ 0,\ \theta_v(t)<0 & (4b)\end{cases}$$

and $$\Delta\theta_v{}^{-}(t)=\begin{cases}0,\ \theta_v(t)>0 & (5a)\\ -\Delta_v(t),\ \Delta\theta_v(t)\leq 0 & (5b)\end{cases}$$

To proceed from $\Delta\theta_v{}^{+}(t)$ and $\Delta\theta_v{}^{-}(t)$ to $\theta_v(t)$ is now straight-forward, assuming as Relation (2) implies that $$\theta_v(0)=0 \qquad (6)$$

The functions $\Delta\theta_v(t)$, $\Delta\theta_v{}^{+}(t)$, and $\Delta\theta_v{}^{-}(t)$ defined in Relations (3) through (5) are related by the equation $$\Delta\theta_v(t)=\Delta\theta_v{}^{+}(t)-\Delta\theta_v{}^{-}(t) \qquad (7)$$

Let $t_k$ be the $k$th instant of time at which $\Delta\theta_v(t)\neq 0$. Then $$\theta_v(t_m<t<t_{m+1})=\sum_{k=1}^{m}\Delta\theta_v(t_k),\ \theta_v(t<t_1)=0 \qquad (8)$$

The preceding discussion can be summarized by stating that the phase of signals $X_v$ and $e_v$ in FIG. 1 will be advanced $2\pi/n$ radians for each pulse introduced at $\Delta\theta_v{}^{+}$ and will be retarded by $2\pi/n$ radians for each pulse introduced at $\Delta\theta_v{}^{-}$. It should, moreover, be noted that $$f_c/f_r=2\pi f_c/\omega_r=n \qquad (9)$$

where $f_c$ is the clock rate, $f_r$ is the rate of the steady-state output $X_v$ of the variable-phase generator 3, $\omega$ is the steady-state angular frequency of the sinusoidal output $e_v$, and $n$ is the number of states which the counter used as the variable-phase generator can assume.

In what follows the terms "AND" gate, "OR" gate, "flip-flop," are frequently used. These terms are used herein in the sense customary in the art, but before proceeding with a more detailed description of our invention, these terms will be explained here as follows:

The term "AND" gate refers to a circuit type in which the output is rendered positive (i.e., high) only by rendering all the input terminals positive. Thus to change the output from negative (i.e., low) to positive all of the input terminals must be positive. However, the output may be changed from positive to negative by supplying a negative potential to any input terminal.

The term "OR" gate refers to a circuit in which to make the output negative all inputs must be negative. If any input is positive, the output is positive.

The AND and OR functions have been described in terms of a signal convention in which the presence of a true signal is represented by the most positive of two possible voltages. Inversion of this convention to make the most negative voltage representative of a true signal inverts the AND and OR functions performed by specific gate implementations.

Figure 2:
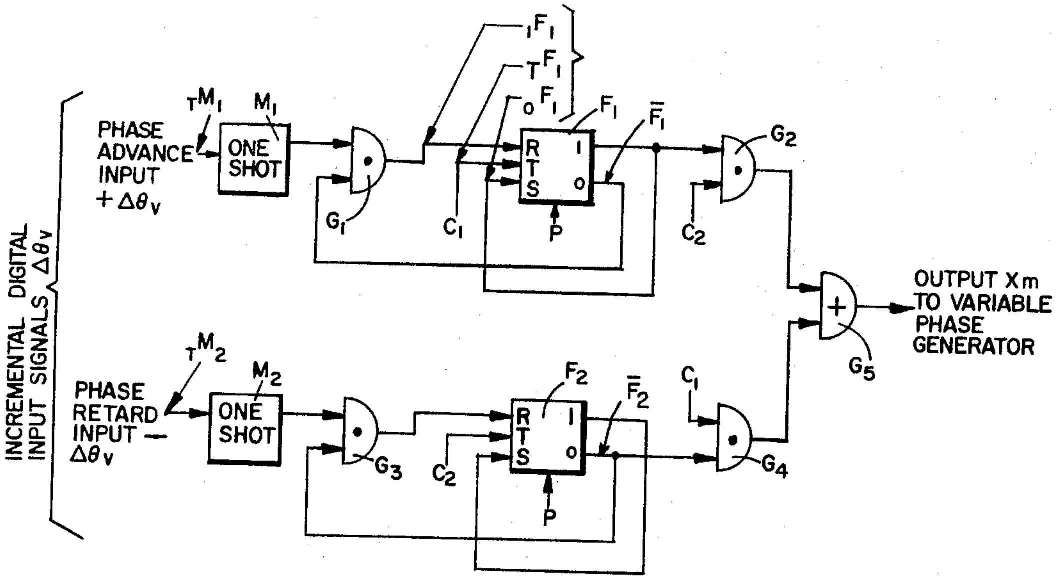
FIG. 2 is a logic diagram of the phase-modulator.

The flip-flops of FIG. 2 are of the R-S type (ref.: Montgomery Phister, Jr., Logical Design of Digital Computers, New York, John Wiley & Sons, Inc., 1959, pp. 128–129, 134–135) which provide temporary storage of a binary digit or of a control signal. The flip-flop is a circuit adapted to operate in either one of two stable states, and, in the presence of appropriate signal levels at the R and S inputs, to transfer from the state in which it is operating to the other stable state shortly after receiving a clock pulse. In one state of operation referred to as the set (true) state the flip-flop represents the binary digit "one" and in the other state referred to as the reset (false) state the binary "zero."

Figure 3:
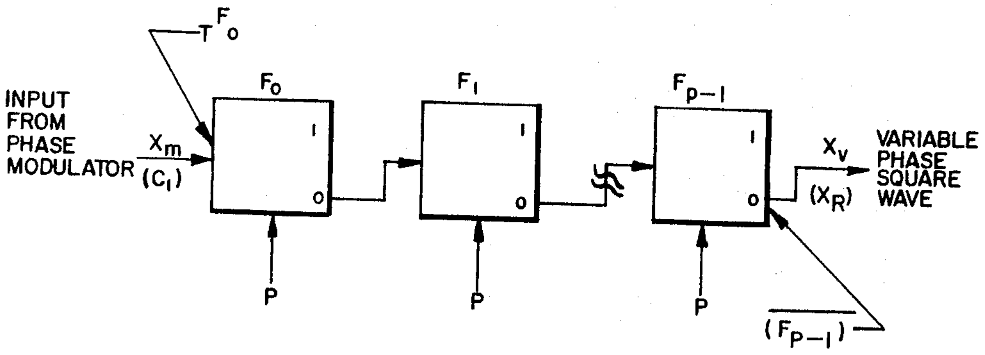
FIG. 3 is a logic diagram of the fixed and variable phase generator.
Figures 4A, 4B, 4C, 4D, 4E, 4F, 4G, 4H:
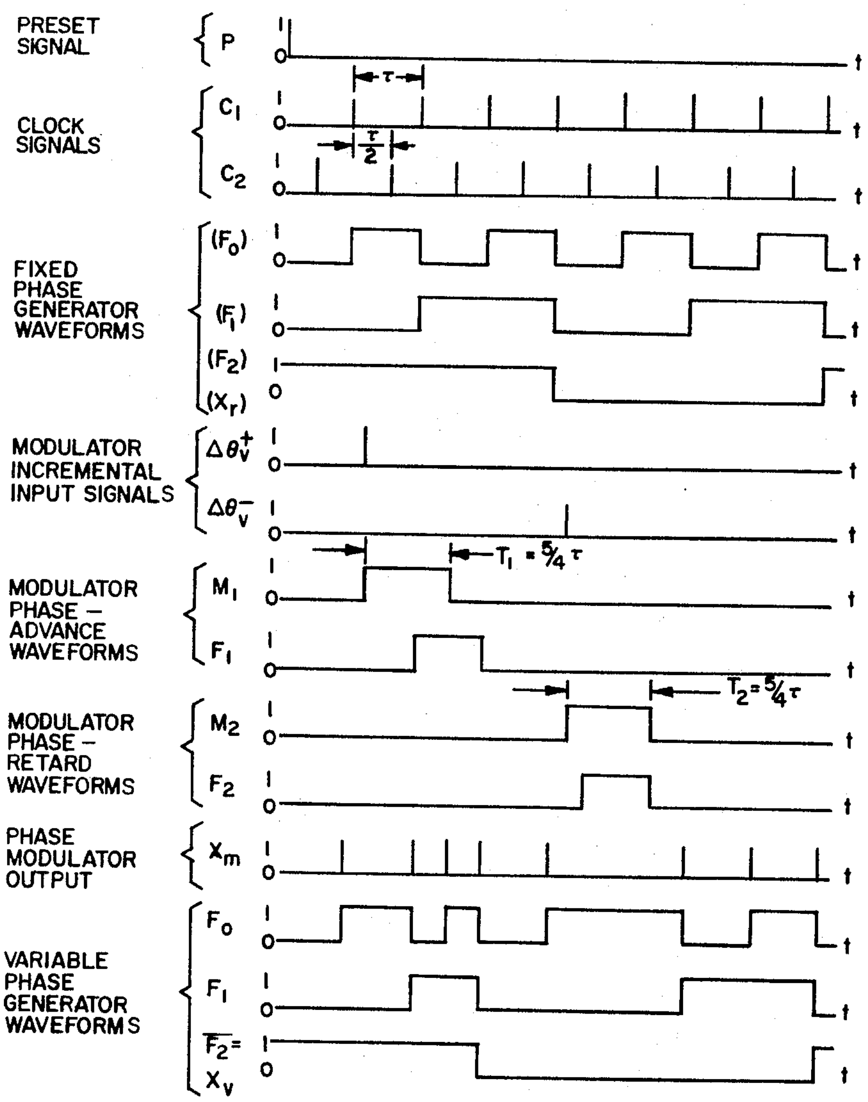
FIG. 4 illustrates the various waveforms present throughout the circuit.

The flip-flops of FIG. 3 are of the T type (ref.: M. Phister, cited supra) which have a single input line which causes the memory element to change state shortly after the input signal changes from zero to "one" but leaves it in its former state otherwise.

Each of the monostable or one-shot multivibrators $M_1$ and $M_2$ illustrated in FIG. 2 provides an output signal of a predetermined duration and is adapted to operate in a stable state until triggered to operate in an unstable state for the predetermined duration. The unstable state hereinafter being referred to as the true output state and the stable state as the false state.

*Phase modulator*

The logic diagram of the phase modulator is shown in FIG. 2. This component of the phase-modulated generator consists of phase-advancing elements including one-shot $M_1$, AND-gates $G_1$ and $G_2$, and flip-flop $F_1$, and of phase-retarding elements including one-shot $M_2$, AND-gates $G_3$ and $G_4$, and flip-flop $F_2$. The OR-gate $G_5$ provides the output of the phase modulator by superimposing the outputs of the phase-advancing and phase-retarding elements. It should be noted that the same symbol is used for the principal output of a logic element as is assigned to the logic element itself.

Operation of the phase-advancing elements will be described first. The one-shot multivibrator $M_1$ responds to each pulse applied by providing a standard pulse at its true output which remains true for time $T_1$, where $$T_1=\frac{5}{4}\tau \qquad (1)$$

In Relation (1), $\tau$ is the clock period. Because flip-flop $F_1$ is normally in the false state, the false output of $F_1$ enables AND-gate $G_1$ to permit the above pulse to produce a true output from this gate, thereby applying a true set input at $1^{F_1}$ to flip-flop $F_1$. The next pulse of clock train $C_1$ will thus cause flip-flop $F_1$ to go true, thereby producing inputs $$1^{F_1}=0 \qquad (2a)$$

$$0^{F_1}=1 \qquad (2b)$$

to flip-flop $F_1$. Flip-flop $F_1$ will, consequently, go false when the next $C_1$ pulse arrives and will remain in this state until another phase-advance input pulse arrives at $\Delta\theta_v{}^{+}$.

An essential feature of the logic design of the phase-advancing elements is the choice of the duration of the asynchronous pulse generated at $M_1$ to encompass either one or two pulses of clock train $C_1$. Regardless of the timing of the pulse at $M_1$ relative to clock train $C_1$, the pulse at $M_1$ will encompass at least one $C_1$ pulse which it does not truncate, thereby allowing clock $C_1$ to place flip-flop $F_1$ in the true state with great reliability. Another essential feature of the logic design is the arrangement whereby flip-flop $F_1$ will go false on the $C_1$ pulse immediately following the $C_1$ pulse which causes it to go true, regardless of the state of $M_1$ during the second $C_1$ pulse. Thus each pulse applied at the phase-advance input $\Delta\theta_v{}^{+}$, causes flip-flop $F_1$ to be true during exactly one $C_2$ pulse, which is emitted from AND-gate $G_2$ and at $X_m$ through the OR-gate $G_5$.

The arrangement of the phase-retarding elements is identical to that of the phase-advancing elements except for two important differences. First, flip-flop $F_2$ is clocked by clock train $C_2$. Second, AND-gate $G_4$ is enabled by the false output of flip-flop $F_2$. Thus each pulse applied at the phase-retard input $\Delta\theta_v^+$ causes flip-flop $F_2$ to be true during exactly one $C_1$ pulse, which is inhibited at AND-gate $G_4$.

From the above discussion, it can be seen that normally a continuous train of $C_1$ pulses is emitted from AND-gate $G_4$, and then from OR-gate $G_5$ at $X_m$. One of these $C_1$ pulses is inhibited, and thus does not appear at the output of OR-gate $G_5$, in response to each pulse applied at phase-retard input $\Delta\theta_v^-$. Moreover, one $C_2$ pulse is emitted at $X_m$ through gates $G_2$ and $G_5$ in response to each pulse applied at phase-advance input $\Delta\theta_v^+$.

The logic equations which follow govern the operation of the phase modulator:

$$\left.\begin{array}{l} T^{M_1}=\Delta\theta_v^+ \\ T_1=5/4\tau \end{array}\right\} \text{One-shot multivibrator 1 input and timing equations} \quad \begin{array}{r}(3a)\\(3b)\end{array}$$

$$\left.\begin{array}{l} T^{M_2}=\Delta\theta_v^- \\ T_2=5/4\tau \end{array}\right\} \text{One-shot multivibrator 2 input and timing equations} \quad \begin{array}{r}(4a)\\(4b)\end{array}$$

$$\left.\begin{array}{l} 1^{F_1}=G_1 \\ T^{F_1}=C_1 \\ 0^{F_1}=F_1 \end{array}\right\} \text{Flip-flop 1 input equations} \quad \begin{array}{r}(5a)\\(5b)\\(5c)\end{array}$$

$$\left.\begin{array}{l} 1^{F_2}=G_3 \\ T^{F_2}=C_2 \\ 0^{F_2}=F_2 \end{array}\right\} \text{Flip-flop 2 input equations} \quad \begin{array}{r}(6a)\\(6b)\\(6c)\end{array}$$

$$\left.\begin{array}{l} G_1=\overline{F}_1M_1 \\ G_2=C_2F_2 \\ G_3=\overline{F}_2M_2 \\ G_4=C_1\overline{F}_2 \\ G_5=G_2+G_4 \end{array}\right\} \text{Gate equations} \quad \begin{array}{r}(7)\\(8)\\(9)\\(10)\\(11)\end{array}$$

$$X_m=G_5\}\text{Phase-modulator output equation} \quad (12)$$

In Relations ($3b$ and $4b$), $T_1$ and $T_2$ represent the duration of pulses emitted by one-shot multivibrators $M_1$ and $M_2$, respectively, while $\tau$ is the clock period. The values of $T_1$ and $T_2$ are suitable for use with any clock duty cycle up to 0.25, the maximum clock duty cycle desirable for use in the phase-modulated generator. All flip-flops in the phase modulator 2 are of the RS type. (Ref.: Phister, Montgomery, Logical Design of Digital Computers, New York: John Wiley & Sons, Inc., 1958, pp. 115–117, 121 ff.) The rate at which input pulses are applied to $\Delta\theta_v^+$ and $\Delta\theta_v^-$ should be limited to that which permits distinct output pulses to be emitted by $M_1$ and $M_2$. The output $X_m$ in Relation (12) is applied to the input of the variable-phase generator 3.

FIGS. *4a–4h* show various waveforms relating to the digital phase-modulated generator. FIGS. *4a, 4b, 4d, 4e, 4f* and *4g* relate to the phase modulator 2. Response of the phase modulator 2 to a single phase-advance pulse followed by a single phase-retard pulse is shown.

*Variable-phase generator*

The purpose of the variable-phase generator 3 in FIG. 1 is to accept as an input the pulse train $X_m$ from the phase modulator 2 and to provide as an output the square wave $X_v$ of steady-state frequency $1/n$ times the steady state pulse rate of $X_m$. If, as in the case to be described, only a single-phase output is necessary, $n$ may be any even positive integer.

The logic diagram of a variable-phase generator 3 is shown in FIG. 3. The variable-phase generator 3 shown is a p-stage counter having $2^p$ states, where $p$ is a positive integer. The logic equations for the variable-phase generator shown are as follows:

$$T^{F_0}=X_m\}\text{Variable-phase-generator input equation} \quad (1)$$

$$T^{F_k}=\overline{F_{k-1}}\,0<k<p\}\text{General flip-flop input equation} \quad (2)$$

$$X_v=\overline{F_{p-1}}\}\text{Variable-phase-generator output equation} \quad (3)$$

All flip-flops in the variable-phase generator in FIG. 3 are of the T type. (Ref.: Phister, Montgomery, Logical Design of Digital Computers, New York: John Wiley & Sons, Inc., 1958, pp. 126–128.)

The design of the variable-phase generator determines both what clock rate must be used to obtain a given output frequency at $X_v$ or $e_v$ in FIG. 1 and the weight of each incremental digital input pulse applied at $\Delta\theta_v^+$ or $\Delta\theta_v^-$ in that figure. Thus the required clock rate is $$f_c=nf_r=n\omega_r/2\pi \quad (4)$$

where $f_c$ is the clock rate, $n$ is the number of states of the counter in the variable-phase generator 3, $f_r$ is the steady-state frequency of the output $X_v$ of the variable-phase generator, and $\omega$ is the angular frequency of the sinusoidal output $e_v$. The weight of each incremental input pulse in electrical radians is $$W_v=2\pi/n \quad (5)$$

where $W_v$ is the pulse weight and $n$ is the number of states of the counter in the variable-phase generator.

The variable-phase generator design in FIG. 3 requires that $n$ in Equations 4 and 5 satisfy the equation $$n=2^p \quad (6)$$

where $p$ is the number of stages in the counter in FIG. 3. If necessary, this restriction can be removed to permit $n$ to assume any given positive even value by gating the $p-1$ lowest order stages to recycle each time $n/2$ pulses are introduced at $X_m$.

The variable-phase generator 3 and the fixed-phase generator 4 in FIG. 1 are normally of identical design. Thus the logic diagram in FIG. 3 may be used for both. The input of the fixed-phase generator is the primary clock train $C_1$.

Waveforms for a three-stage variable-phase generator are shown in FIG. *4h*. Corresponding waveforms for a three-stage fixed-phase generator appear in FIG. *4c*.

For some applications, the variable-phase generator 3 and the fixed-phase generator 4 can each be designed to have multiple-phase outputs. Logical design to provide two-phase outputs, three-phase outputs, or other multiple-phase outputs is possible.

While the invention has been described in terms of an embodiment based upon AND and OR logic, it is pointed out that other logic, such as NAND logic may be utilized to mechanize the invention. Thus, while we have shown a particular embodiment of the invention, it will of course be understood that we do not wish to be limited thereto, since many modifications both in the circuit arrangements and the instrumentalities employed may be made. We contemplate by the appended claims to cover any such modifications as fall within the true spirit and scope of our invention.

What is claimed is:

1. A phase-modulated generator comprising first means for providing a train of output pulses normally having an equal time spacing, second means operatively coupled to said first means for selectively adding pulses to or subtracting pulses from said train so as to change the time spacing between adjacent output pulses in said train and bistable means coupled to said first means and operative to shift from one stable state to another stable state upon the occurrence of a predetermined number of output pulses from said train to provide an output signal whose phase is varied by said second means.

2. A digital-phase modulated generator comprising in combination: a two phase clock means for generating a first and a second pulse train, said second pulse train being displaced in phase a fixed predetermined amount from said first pulse train;

a first means responsively connected to said clock means and having a first input terminal for receiving phase-advance pulses, a second input terminal for receiving phase-retard pulses, and an output terminal, said first means being operative to emit at its output terminal, in the absence of an input pulse, said first pulse train, and for each phase-advance pulse applied to said first input terminal to add one pulse from said second pulse train to said first pulse train, and for each phase-retard pulse applied to said second input terminal to remove one pulse from said first pulse-train; and a second means responsively connected to said first means and having a two state output signal, said second means being operative to count the output pulses from said first means and to switch its output state each time a predetermined number of said output pulses have been counted, whereby the output of said second means is a square wave having a phase which is shifted an amount dependent upon the number of pulses present on said first and second input terminals.

3. In a digital phase-modulated generator the combination comprising: two phase clock means for generating two pulse trains of equal rate, the phase of said pulse trains being displaced a predetermined fixed amount from each other;

phase modulator means having as inputs two incremental digital signals, one a phase-advance input and the other a phase-retard input, and also connected to receive as inputs the output of said clock means;

said phase modulator means being adapted to emit at its output, pulses from the first of said two pulse trains in the absence of said input incremental digital signals, and for each of said phase-advance pulses applied to said input to emit one pulse from the second of said two pulse trains, and for each phase-retard pulse applied to said input to remove one pulse from said first pulse train; and variable-phase generator means for counting the output pulses emitted from said phase modulator means, and having as an output a signal the frequency and phase of which is directly proportional to the number of said counted pulses.

4. The combination defined in claim 1 wherein said bistable means includes an $n$ number of T-type flip-flops serially connected, the number $n$ determining the frequency of said output signal according to the following formula, in which $f_c$ is said reference clock frequency, and $f_r$ is the steady-state frequency of said output signal $$f_r = f_c / n$$

5. The combination of claim 2 further comprising:

a third means responsively connected to said clock means and having a two state output signal, said third means being operative to count the pulses in said first pulse-train and to switch its output state each time a predetermined number of pulses have been counted, whereby the output of said third means is a reference square wave having a fixed phase.

6. The combination of claim 3 further comprising:

a fixed phase generator means for counting the pulses in said first pulse train, and having as an output a signal the frequency and phase of which is directly proportional to the number of said counted pulses.

References Cited by the Examiner

UNITED STATES PATENTS

| | | | |
|---|---|---|---|
| 2,905,812 | 9/1959 | Doelz et al. | 332—9 X |
| 2,968,010 | 1/1961 | Case | 332—9 X |
| 3,054,001 | 9/1962 | Chisholm et al. | 307—88.5 |
| 3,192,478 | 6/1965 | Metz | 328—44 |

ROY LAKE, *Primary Examiner.*

A. L. BRODY, *Assistant Examiner.*